(12) United States Patent
Rohr et al.

(10) Patent No.: US 11,875,015 B2
(45) Date of Patent: Jan. 16, 2024

(54) ACCESS CARD WITH CONFIGURABLE TRANSACTION RULES

(71) Applicant: Truist Bank, Charlotte, NC (US)

(72) Inventors: Robert Rohr, Charlotte, NC (US); Selcuk Karakaplan, New York, NY (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/719,994

(22) Filed: Apr. 13, 2022

(65) Prior Publication Data

US 2023/0333707 A1     Oct. 19, 2023

(51) Int. Cl.
*G06F 3/0482*     (2013.01)
*G06F 21/34*      (2013.01)

(52) U.S. Cl.
CPC ............ *G06F 3/0482* (2013.01); *G06F 21/34* (2013.01)

(58) Field of Classification Search
CPC ................................ G06F 3/0482; G06F 21/34
See application file for complete search history.

(56) References Cited

U.S. PATENT DOCUMENTS

| | | | |
|---|---|---|---|
| 7,653,597 B1 | 1/2010 | Stevanovski et al. | |
| 7,860,789 B2 | 12/2010 | Hirka et al. | |
| 10,262,313 B2 | 4/2019 | Lafeer et al. | |
| 10,262,316 B2 * | 4/2019 | Candelore ............ | G06Q 20/352 |
| 11,244,289 B2 | 2/2022 | Johnson | |
| 11,550,450 B1 | 1/2023 | Rohr et al. | |

| | | | |
|---|---|---|---|
| 2007/0067446 A1 | 3/2007 | Jones et al. | |
| 2012/0197803 A1 * | 8/2012 | Febonio .................. | H04W 4/24 |
| | | | 705/44 |
| 2012/0259776 A1 | 10/2012 | Bajaj et al. | |
| 2012/0290420 A1 * | 11/2012 | Close ..................... | G06Q 20/20 |
| | | | 705/16 |

(Continued)

FOREIGN PATENT DOCUMENTS

CA      3071178 A1      8/2020

OTHER PUBLICATIONS

Notice of Allowance, U.S. Appl. No. 17/718,998, filed Sep. 2, 2022, 9 pages.

(Continued)

*Primary Examiner* — Jennifer N Welch
*Assistant Examiner* — Ashley M Fortino
(74) *Attorney, Agent, or Firm* — Kilpatrick Townsend & Stockton LLP; Michael A. Springs, Esq.

(57) ABSTRACT

Rules can be selectively applied by a user to an access card using a graphical user interface (GUI) of a mobile application. For example, the mobile application can provide a graphical user interface through which the user can select how usage of the access card is to be handled by the service provider. The mobile application can receive, through the graphical user interface, input from the user indicating one or more rules to be applied to the access card. The one or more rules can dictate how usage of the access card is to be handled by the service provider. In response to receiving the input, the mobile application can transmit one or more commands to a computer system associated with the service provider. The computer system can receive the one or more commands and implement the one or more rules selected by the user of the access card.

15 Claims, 5 Drawing Sheets

(56) References Cited

U.S. PATENT DOCUMENTS

| | | | |
|---|---|---|---|
| 2013/0212666 A1* | 8/2013 | Mattsson | G06Q 20/385 |
| | | | 726/9 |
| 2014/0006277 A1 | 1/2014 | Rao | |
| 2014/0172693 A1 | 6/2014 | Kanjitia et al. | |
| 2017/0278092 A1 | 9/2017 | Simanek et al. | |
| 2019/0251542 A1 | 8/2019 | Sjoberg et al. | |
| 2019/0251590 A1* | 8/2019 | Bodington | G06Q 30/02 |
| 2021/0158348 A1 | 5/2021 | Wardman et al. | |
| 2021/0241256 A1 | 8/2021 | Caldwell | |

OTHER PUBLICATIONS

Non-Final Office Action, U.S. Appl. No. 17/719,993, dated Feb. 22, 2023, 17 pages.
Non-Final Office Action, U.S. Appl. No. 17/980,226, dated May 22, 2023, 8 pages.
Notice of Allowance, U.S. Appl. No. 17/980,226, dated Jul. 13, 2023, 5 pages.

* cited by examiner

ACCESS CARD WITH CONFIGURABLE TRANSACTION RULES

TECHNICAL FIELD

The present disclosure relates generally to cards such as access cards. More specifically, but not by way of limitation, this disclosure relates to a mobile application usable to configure rules for an access card.

BACKGROUND

A service provider can provide an end user with an access card for use in accessing objects (e.g., physical objects or virtual objects) provided by the service provider or another entity. The access card may be linked to an account hosted by the service provider. In some cases, the service provider may have a computing system through which end users can access and make use of their accounts. The end users can operate client devices to interact the computing system to monitor or perform functions using their accounts. For example, an end user can execute a mobile application on his client device. The mobile application can provide a mobile interface through which the end user can monitor his account and perform functions using his account. The mobile application can interact with one or more backend servers of the computing system, where the backend servers are configured to support the mobile application. Alternatively, the computing system can include one or more web servers that are configured provide a web interface through which the end user can monitor his account and perform functions using his account via a web browser.

SUMMARY

One example of the present disclosure includes a system comprising an access card of a user, the access card being associated with an account of the user with a service provider. The system also includes a client device of the user. The client device can include one or more processors; and a memory including program code for a mobile application that is executable by the one or more processors for causing the one or more processors to perform operations. The operations can include providing a graphical user interface through which the user can select how usage of the access card is to be handled by the service provider. The operations can include receiving, through the graphical user interface, input from the user indicating one or more rules to be applied to the access card. The one or more rules can dictate how usage of the access card is to be handled by the service provider. The operations can include, in response to receiving the input, transmitting one or more commands to a computer system associated with the service provider. The computer system can be configured to receive the one or more commands and implement the one or more rules selected by the user of the access card.

Another example of the present disclosure can include a method. The method can involve providing a graphical user interface through which a user can select how usage of an access card is to be handled by a service provider. The access card can be associated with an account of the user with the service provider. The method can involve receiving, through the graphical user interface, input from the user indicating one or more rules to be applied to the access card. The one or more rules can dictate how usage of the access card is to be handled by the service provider. The method can involve, in response to receiving the input, transmitting one or more commands to a computer system associated with the service provider. The computer system can be configured to receive the one or more commands and implement the one or more rules selected by the user of the access card. The method can be implemented by one or more processors of a client device.

Still another example of the present disclosure can include a non-transitory computer-readable medium comprising program code that is executable by one or more processors of a client device for causing the one or more processors to perform operations. The operations can include providing a graphical user interface through which a user can select how usage of an access card is to be handled by a service provider. The access card can be associated with an account of the user with the service provider. The operations can include receiving, through the graphical user interface, input from the user indicating one or more rules to be applied to the access card. The one or more rules can dictate how usage of the access card is to be handled by the service provider. The operations can include involve, in response to receiving the input, transmitting one or more commands to a computer system associated with the service provider. The computer system can be configured to receive the one or more commands and implement the one or more rules selected by the user of the access card.

DETAILED DESCRIPTION

Figure 1:
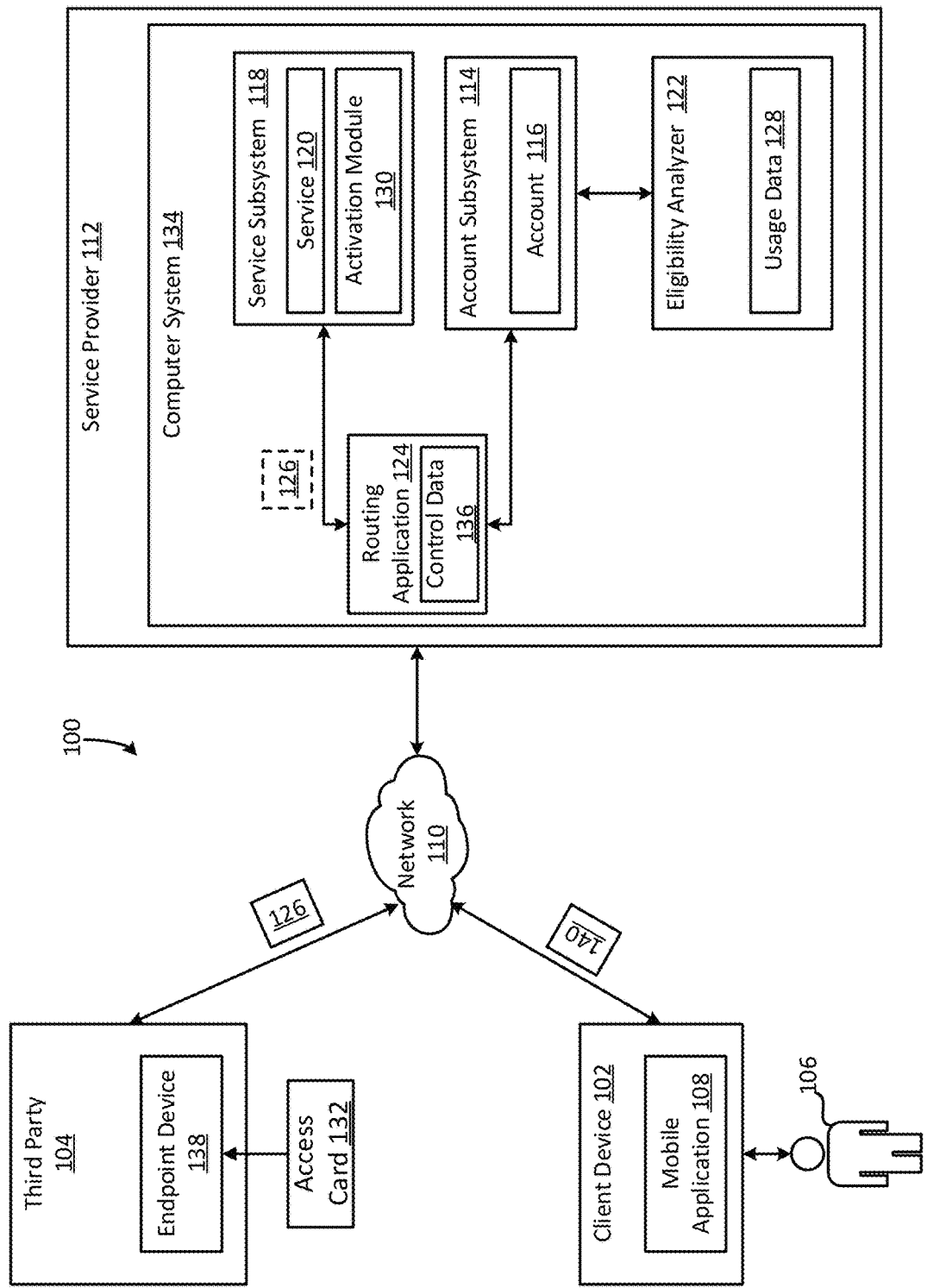
FIG. 1 is a block diagram of an example of a system for implementing some aspects of the present disclosure.

Certain aspects and features of the present disclosure relate to a mobile application through which an end user of an access card can selectively apply rules in relation to the access card. The access card may be provided to the end user by a service provider and may be linked to an account of the end user with the service provider. The rules can dictate how usage of the access card is to be handled by the service provider associated with the access card. For example, the rules can dictate that certain tasks performed using the access card are to be handled using an account of the user with the service provider, and that other tasks performed using the access card are to be handled by a service provided separately from the account by the service provider. The end user can provide the rules through a graphical user interface of the mobile application. In response to receiving the rules, the mobile application can coordinate with one or more backend servers of the service provider to implement the rules. In this way, the mobile application can allow the end user can control which tasks are completed using their account and which tasks are completed using the service.

As the access card is used with third parties (e.g., at their endpoint terminals and websites), the third parties may generate corresponding network requests and transmit the network requests over one or more networks to the backend servers of the service provider. The backend servers can receive the network requests and handle them using an account subsystem or a service subsystem, depending on the selections made by the user in the mobile application. The account subsystem and the service subsystem may both be operated by the service provider. The account subsystem can complete (e.g., fulfill) the network requests using the account of the end user hosted by the service provider. The service subsystem can complete the network requests using the service provided by the service provider.

As one particular example, the user can select between using the account and the service in relation to multiple types of tasks via the mobile application. The mobile application can then transmit one or more commands to the one or more backend servers, which can configure a routing application based on the commands to complete network requests associated with a first type of task using the service subsystem and network requests associated with a second type of task using the account subsystem. Subsequent network requests can then be automatically routed to the account subsystem or the service subsystem based on the user's selections in the mobile application. In this way, the mobile application can allow the end user can inherently control which types of network requests are to be completed using their account and which types of network requests are to be completed using the service.

The access card may be any suitable type of digital card or physical card usable to obtaining access to a resource, such as a physical or virtual item. Network requests may be initiated by the end user using the access card to obtain access to any suitable type resource. For example, the end user may slide the card through a card reader or otherwise use the card to interact with an endpoint device positioned at a physical location to access to a resource. Based on the card interaction, the endpoint device can generate and transmit a network request to the service provider for processing. The routing application of the service provider may receive the network request, determine one or more characteristics of the network request, and route the network request to one of the computer subsystems based on the one or more characteristics of the network request and the rules applied by the end user in the mobile application.

In some examples, the service provider can determine whether the end user is authorized (e.g., eligible) to access the service prior to activating the service for the end user. The service provider may determine whether the end user can access the service by analyzing usage data relating to the user's account. The usage data may include inflows and outflows relating to the user's account during a selected time period. The analysis may be performed using a model, such as a machine-learning model. Examples of a machine-learning model can include a neural network, a Naive Bayes classifier, or a support vector machine. The model can analyze the usage data (e.g., account history) and generate an output indicating whether the end user can access for the service. If the end user is authorized to access the service and the service is not currently activated for the user, the service provider may activate the service for the user. If the end user is authorized to access the service and the service is already activated for the user, the service provider may maintain the service as active for the user. If the end user is not authorized to access the service and the service is currently activated for the user, the service provider may deactivate the service for the user. If the end user is not authorized to access the service and the service not currently activated for the user, the service provider may maintain the service as deactivated for the user.

Over time, the service provider may periodically reassess whether the end user is authorized to access the service and activate or deactivate the service accordingly. The service provider may also transmit notifications to the mobile application regarding the same. The mobile application can receive the notifications from the service provider generate visual outputs in the graphical user interface indicating whether the service is activated at a given point in time.

In some examples, the service provider can provide a notification to the end user indicating whether they are authorized to access the service, prior to the service being activated. The mobile application can receive the notification and responsively generate a visual notification within the graphical user interface indicating this authorization. The end user may then respond to the notification by approving or disapproving the service. The service may only be activated if the end user approves the service. In some examples, the end user may need to apply a digital signature to a digital document via the mobile application to approve the service.

Some examples of the present disclosure can provide end users with a higher degree of flexibility and control over usage of their access cards. For example, in a conventional scenario, a service provider may provide an access card to an end user. The access card is linked to the user's account with the service provider, and the service provider's computer system handles all network requests relating to the access card by using the user's account. There is no capability for the end user to selectively apply rules to the access card so that different types of tasks, and consequently different types of network requests, are handled in different ways.

Some examples of the present disclosure can overcome one or more of the abovementioned problems by allowing an end user, that has an account hosted by a service provider, to apply rules to an access card. With these rules, the user can dictate how tasks are performed in relation to the access card and, consequently, how requests (e.g., network requests corresponding to transactions) associated with card usage are routed through the service provider. For example, the end user can select that some types of tasks are to be handled using the user's account and other types of tasks are to be handled using a service offered by the service provider, where the service is distinct from the user's account. This can dictate which computer subsystems handle such requests. Using the rules, the end user is provided with a greater level of control, and a more granular level of control, than may otherwise be possible. Additionally, as mentioned above, the routing feature may be closely monitored and controlled to prevent abuse of the system. For example, the end user may be prevented from using the service until the computer system determines that the end user is authorized to do so, for example based on an analysis of the user's account history. This can be dynamic such that the end user's account history is periodically reassessed and the routing feature is enabled or disabled accordingly, to improve the security of the system.

These illustrative examples are given to provide the reader with the general subject matter discussed here and are not intended to limit the scope of the disclosed concepts. The following sections describe various additional features and examples with reference to the drawings in which like numerals indicate like elements.

FIG. 1 is a block diagram of an example of a system 100 for implementing some aspects of the present disclosure. The system 100 includes a service provider 112 that can operate a computer system 134. In some examples, the computer system 134 may be a distributed computer system, such as a cloud computing system or a computing cluster, formed from one or more nodes (e.g., physical or virtual servers) that are in communication with one another via a network. Examples of the network can include a local area network or the Internet. The computer system 134 can be formed from a physical infrastructure that includes various network hardware, such as routers, hubs, bridges, switches, and firewalls. The physical infrastructure can also include one or more servers through which a user 106 can perform account functions related to an account 116. The servers may provide backend support for a mobile application 108 or may provide a web interface for enabling the user 106 to perform the account functions. In some examples, the servers may be part of, or otherwise interface with, an account subsystem 114 configured to effectuate the account functions.

A user may establish an account 116 with the service provider 112 for use in performing various functions. The account 116 may be of any suitable type. For example, the service provider 112 may be a bank and the account 116 may be a deposit account. The process of establishing the account 116 may require the user to fill out forms for security purposes. After establishing the account 116 with the service provider 112, the user 106 may use the account to perform various functions. For example, the user 106 may use the account 116 to obtain access to various resources, such as physical objects or virtual objects. Examples of the physical objects can include food, clothing, and electronics. Examples of the virtual objects can include software, videos, and music files.

In some examples, the user 106 may use the account 116 to obtain access to resources of a third party 104 that is different from the user 106 and the service provider 112. For example, the user 106 may use an access card 132 to interact with an endpoint device 138 of a third party 104 for accessing a resource provided by the third party 104. An example of the endpoint device 138 can be a card reader or hub. The access card 132 may be linked to the account 116 and may be provided by the service provider 112. Examples of the access card 132 can include a debit card or a key card for controlling access to a physical location. The access card 132 may be a smart card with contactless technology. The third party 104 can respond to such user interactions by transmitting one or more requests 126 (e.g., network requests) to the computer system 134. For example, the endpoint device 138 can transmit the requests 126 via a network 110, such as the Internet, to the computer system 134. In turn, the computer system 134 can respond to the requests 126 by performing one or more account functions related to the account 116, such as reducing a balance in the account 116 or logging an access time.

The user 106 may also provide resources to the account 116 over time. For example, the user 106 may deposit funds into the account at periodic intervals. Alternatively, an entity that is distinct from but associated with the user 106 may provide resources to the account. One example of such an entity may be an employer of the user 106. Usage of the account 116 may result in inflows to and outflows from the account 116.

Separately from establishing the account 116, the user 106 may register for an online account with the service provider 112 for use in monitoring and performing functions related to the underlying account 116. For example, the user 106 may go through a signup process using the mobile application 108 to register an online account with the computer system 134. The user 106 may then link the online account to the underlying account 116 hosted by the service provider 112. In some such examples, the online account can be distinct from the underlying account 116 and may be used to access the computer system 134 to perform account functions related to the underlying account 116.

The user 106 can register the online account and otherwise interact with the computer system 134 via the mobile application 108, which may be executing on a client device 102. Examples of the client device 102 can include a mobile phone, a laptop computer, a tablet, or a smart watch. The client device 102 can execute the mobile application 108 to interact with the computer system 134 via the network 110. The mobile application 108 may be any suitable type of mobile application (e.g., an Android or iOS application) executing on the client device 102. The mobile application 108 may allow the user to perform account functions related to the underlying account 116 hosted by the service provider 112.

The service provider 112 can provide (e.g., directly or indirectly) the mobile application 108 to the user 106 for controlling the account 116. For example, the service provider 112 may hire developers to create the mobile application 108 and provide the mobile application 108 for download. The user 106 can download the mobile application 108 and then use it to login to the online account. This may involve the mobile application 108 authenticating with the computer system 134. For example, the user 106 can provide a username and password associated with the online account to the mobile application 108, which can transmit that information to the computer system 134 for authentication purposes. After authenticating the username and password, the user 106 may be authorized to access other features of the mobile application 108.

In some examples, the computer system 134 includes an eligibility analyzer 122. The eligibility analyzer 122 can retrieve usage data 129 related to the account 116 from the account subsystem 114. An example of the usage data 128 can an account history describing prior usage of the account 116. The eligibility analyzer 122 can analyze any amount of the usage data 128 to determine whether the user 106 is authorized for a service 120 offered by the service provider 112. The service 120 can be distinct from the account 116 and offered separately from the account 116. The eligibility analyzer 122 can determine whether the user 106 is authorized to access a service 120 based on any number and combination of suitable criteria, such as an age of the user 106, a balance in the account 116, a length of time in which the account 116 has been open, a pattern of usage of the account 116, or any combination of these.

In some examples, the eligibility analyzer 122 can include one or more models configured to receive the usage data 128 as input and generate an output indicating the eligibility of the user 106 for the service 120. The models may include a machine-learning model or another type of model. Examples of the machine-learning model may include neural network or classifier. The machine-learning model may go through a training process to tune weights therein prior to being deployed for use. The training process may include supervised training or unsupervised training, depending on the type of model used and the training data that is available. In some cases, the training data used in the training process may include usage histories that are pre-labeled as authorized or unauthorized to access the service 120.

Depending on the results from the eligibility analyzer 122, the user 106 may be deemed authorized for the service 120. If the user 106 is authorized to access the service 120, the computer system 134 can transmit a notification to the user 106 (e.g., via the mobile application 108, an email, an SMS message, etc.) indicating that the user 106 is authorized for the service 120. The notification may request that user 106 approve or deny the service 120. The user 106 may be able to approve or deny the service 120 via the mobile application 108. For example, the mobile application 108 can receive the notification and generate a graphical interface with an "approve" button, a "deny" button, or both. The buttons can be selected by the user 106 to approve or deny the service 120, respectively. If the user 106 selects the approve button, the mobile application 108 can transmit a command to the computer system 134 for activating the service 120. If the user 106 selects the deny button, the mobile application 108 can transmit a command to the computer system 134 for denying the service 120.

If the user approves the service 120, the computer system 134 may activate the service 120 for the user 106 and transmit another notification to the mobile application 108 indicating that the service 120 is now available. In response, the mobile application 108 may generate a graphical indication that the service 120 is now active for the user 106. Activating the service 120 may involve transmitting a communication to a service subsystem 118 that is configured to manage the service 120 for users. In response to receiving the communication, the service subsystem 118 may perform one or more operations to activate the service 120 for the user 106. For example, the service subsystem 118 can add an entry to a table indicating that the service 120 is active for the user 106.

With the service 120 now active, the user 106 may want to initiate and configure use of the service 120. To that end, the mobile application 108 can include graphical features through which the user 106 can control how tasks are to be distributed between the account 116 and the service 120. The tasks may be associated with transactions and other activities engaged in by the user using the access card 132. For example, the user 106 may interact with the mobile application 108 to select that some types of tasks (e.g., transactions) should be handled using the service 120 and other types of tasks should be handled using the account 116. As one such example, the user 106 may select that tasks relating to one entity (e.g., third party 104) should be handled using the service 120 and tasks relating to another entity should be handled using the account 116. Through the mobile application 108, the user 106 can choose and set parameters, thresholds, and other rules to selectively assign tasks having any characteristic or characteristics to either the service 120 or the account 116 as desired. In this way, the user 106 can choose how tasks are to be handled by the computer system 134, which in turn can dictate how corresponding requests are routed through the computer system 134.

Once the user 106 has input the rules via the mobile application 108, the mobile application 108 can transmit one or more commands 140 to the computer system 134 for causing the computer system 134 to implement the rules. The commands 140 may include the rules. In some examples, the computer system 134 may generate corresponding control data 136 based on the commands 140 (e.g., the rules therein). The computer system 134 can then supply the control data 136 to a routing application 124. The control data 136 can configure the routing application 124 to implement the user's rules. For example, the control data 136 can include a mapping that correlates certain task parameters to certain destinations, such as the account subsystem 114 or the service subsystem 118.

Once the routing application 124 is configured based on the commands 140, the routing application 124 may forward subsequent requests to the appropriate destination. For example, the computer system 134 may receive a request 126 from a third party 104. The request 126 can include task data related to a task performed using the access card 132. For example, the request 126 may include transaction data related to online or in-store payments made using the access card 132 (e.g., using account information stored or printed on the access card 132). The computer system 134 can forward the request 126 to the routing application 124, which can extract and analyze the task data to determine one or more parameters associated with the task. Examples of such parameters can include (i) a third party that is associated with the task, (ii) a geographical location associated with the task, (iii) an amount associated with the task, (iv) a type of resource associated with the task, or (v) any combination of these. Upon receiving the request 126, the routing application 124 can access the control data 136 to determine the appropriate destination for the request 126 or the task data therein. For example, the routing application 124 can access the control data 136 to determine that the request 126 or the task data therein is to be forwarded to the service subsystem 118 based on the corresponding task having a first parameter value. Alternatively, the routing application 124 can access the control data 136 to determine that the request 126 or the task data therein is to be forwarded to the account subsystem 114 based on the task having a second parameter value that is different from the first parameter value. In this way, the routing application 124 can automatically forward requests or task data to either the service subsystem 118 or the account subsystem 114 depending on their parameters and the user's selected rules.

As the user 106 continues to use the account 116 over time (e.g., to engage in online transactions using the account 116), the usage data 128 may be updated accordingly. So, the eligibility analyzer 122 may periodically reassess (e.g., monthly) the eligibility of the user 106 for the service 120. If the eligibility analyzer 122 subsequently determines that the user 106 is no longer authorized for the service 120, the eligibility analyzer 122 may transmit a communication to the service subsystem 118 to deactivate the service 120 for the user 106. In response to receiving the communication, the service subsystem 118 may perform one or more operations to deactivate the service 120 for the user 106. For example, the service subsystem 118 can remove an entry from a table of users for which the service 120 is active. Additionally or alternatively, the eligibility analyzer 122 can generate corresponding control data 136 and supply the control data 136 to the routing application 124. The control data 136 can configure the routing application 124 to route future requests associated with the user 106 to a default destination, such as the account subsystem 114. This may be the default when the service 120 is not active for the user 106. The control data 136 can override a previously stored mapping so that future requests are routed to the default destination, independently of the user's selections.

Once the service 120 is deactivated for the user 106, the user may 106 remain unauthorized to access the service 120 until the next time window begins. At that point, the above process can repeat with the eligibility analyzer 122 determining whether the user 106 is authorized to use the service 120 during that time window. In this way, access to the service 120 may be limited in duration to a particular time window and the computer system 134 can automatically control access to the service 120 during that time window.

As noted above, the computer system 134 may automatically and periodically assess whether the user 106 is authorized for the service 120. In some examples, the user 106 may also be able to request access to the service 120. For example, the user 106 may select a button in the mobile application 108 for requesting access to the service 120. In response to the selection, the mobile application 108 may transmit a request to the computer system 134 to access the service 120. Based on receiving the request, the computer system 134 can execute the eligibility analyzer 122 to determine whether the user 106 is authorized to use the service 120. If the eligibility analyzer 122 determines that the user 106 is authorized, the computer system 134 may activate the service 120 for the user 106. Otherwise, the computer system 134 may transmit a response to the request indicating that the user 106 is currently unauthorized to access the service 120. In this way, the user 106 may be able to request the service 120 as desired.

It will be appreciated that the example shown in FIG. 1 is intended to be illustrative and non-limiting. Other examples may include more components, fewer components, different components, or a different combination of the components than are shown in FIG. 1. For instance, in another example the eligibility analyzer 122 and the routing application 124 may be combined into a single software module that is capable of implementing both of their functionalities. And although FIG. 1 involves distributing requests between two different subsystems (the service subsystem 118 and the account subsystem 114), other examples may involve a larger number of subsystems and more-complex routing schemes through which the user 106 can select among a larger number of options for handling requests.

Figure 2:
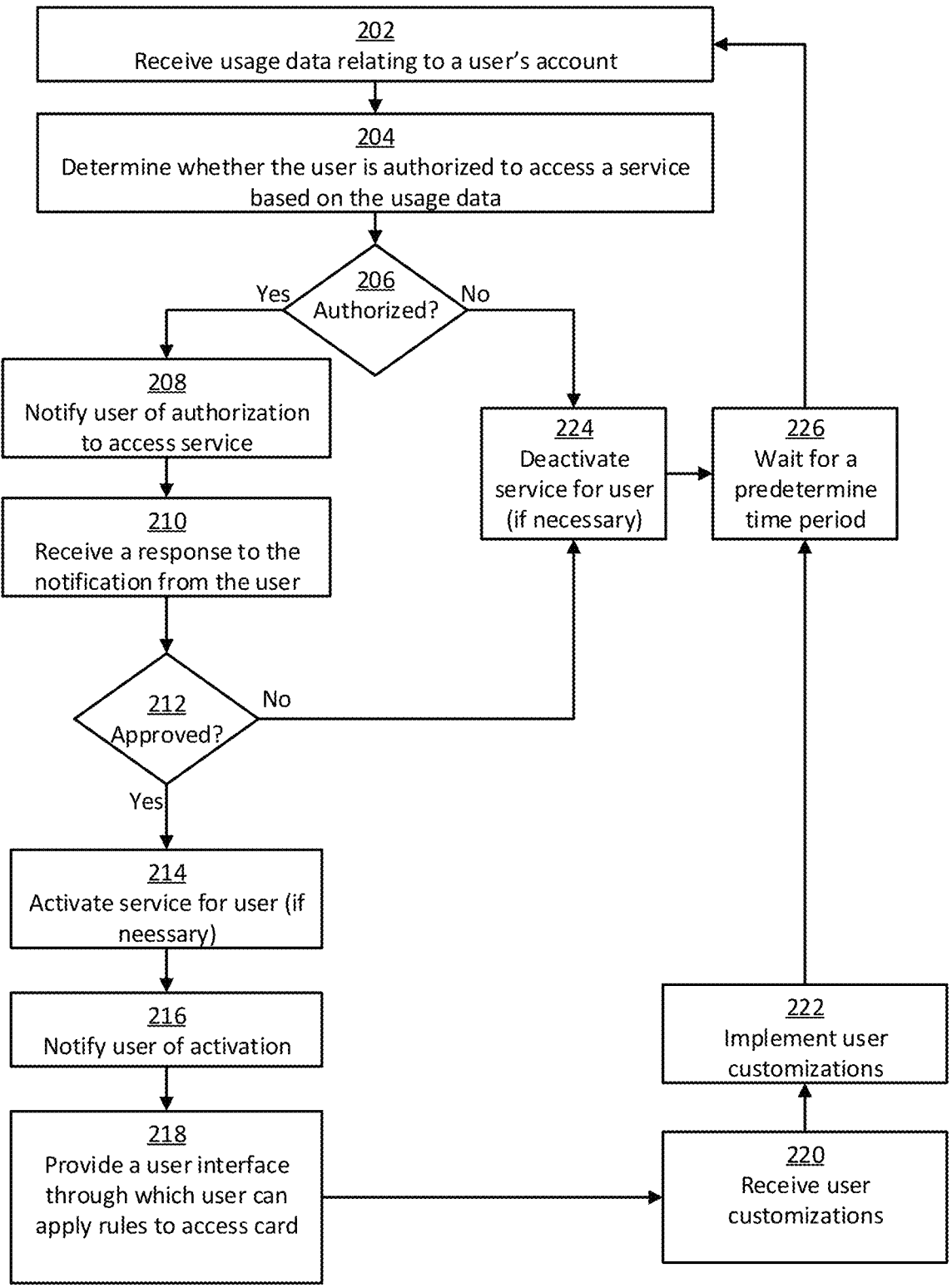
FIG. 2 is a flow chart of an example of a process for implementing some aspects of the present disclosure.

FIG. 2 is a flow chart of an example of a process for implementing some aspects of the present disclosure. Other examples may involve more operations, fewer operations, different operations, or a different order of the operations than are shown in FIG. 2. The operations below will now be described with reference to the components of FIG. 1 above.

In block 202, an eligibility analyzer 122 receives usage data 128 relating to an account 116 of a user 106. The eligibility analyzer 122 may receive the usage data 128 from an account subsystem 114 or another subsystem of a computer system 134 operated by a service provider 112. The eligibility analyzer 122 can also be part of the computer system 134 and may be configured to determine the eligibility of the user 106 for a service 120. An example of the service 120 may be a credit service for providing the user 106 with a credit line, which may be automatically or selectively repaid by the user 106 over time using funds from the account 116.

In block 204, the eligibility analyzer 122 determines whether the user 106 is authorized to access the service 120 based on the usage data 128. This may involve comparing a pattern of usage expressed in the usage data 128 to one or more predefined criteria. In some examples, the eligibility analyzer 122 may employ a model, such as a machine-learning model, to determine whether the user 106 is authorized for the service 120. The eligibility analyzer 122 may also determine one or more parameters for the service 120. Examples of the parameters can include a limit on the service 120 or an interest rate associated with providing the service 120. The eligibility analyzer 122 may determine the parameters based on the usage data 128 and/or other factors. Examples of such factors can include an amount in the account 116, previous timely or delayed payments by the user 106, and socioeconomic or demographic attributes of the user 106. Since these factors can change over time, the service parameters may also dynamically change each time the determination is made by the eligibility analyzer 122.

As shown in block 206, the process can branch to block 208 if the user 106 is determined to be authorized for the service 120 or branch to block 224 if the user 106 is determined to be unauthorized to access the service 120.

In block 208, the computer system 134 notifies the user 106 that the user 106 is authorized for the service 120. For example, the computer system 134 can transmit a message to the user 106 indicating that the user 106 is authorized for the service 120. Additionally or alternatively, the computer system 134 can notify a mobile application 108 that the user 106 is authorized for the service 120.

In block 210, the computer system 134 receives a response to the notification from the user 106. The response can indicate the user's approval or denial of the service 120. For example, the user 106 can operate a client device 102 to select an "approve" button or a "deny" button within a graphical user interface of the mobile application 108. The mobile application 108 can detect this selection and transmit a corresponding communication to the computer system 134 indicating the user's selection. The communication can act as a response to the notification provided to the user 106 in block 208.

In block 212, the computer system 134 determines whether the service 120 was approved or rejected by the user 106. The computer system 134 based on the response received in block 210. If the computer system 134 determines that the service 120 was approved, the process can branch to block 214. Otherwise, the process can branch to block 224, where the computer system 134 can deactivate the service 120 for the user 106 (if necessary). If the service 120 was already previously deactivated for the user 106, then the computer system 134 may not need to deactivate the service 120 again. If the service 120 was not already previously deactivated for the user 106, then the computer system 134 can deactivate the service 120. Deactivating the service 120 may involve communicating with a service subsystem 118 to add an entry to a table or remove an entry from a table. Deactivating the service 120 may additionally or alternatively involve generating and transmitting control data to a routing application 124, for example so that subsequent requests related to the user 106 are automatically routed to an account subsystem 114.

In block 214, the computer system 134 activates the service 120 for the user 106 (if necessary). If the service 120 was already previously activated for the user 106, then the computer system 134 may not need to activate the service 120 again. If the service 120 was not already previously activated for the user 106, then the computer system 134 can activate the service 120. Activating the service 120 may involve communicating with a service subsystem 118 to add an entry to a table or remove an entry from a table. In some examples, the entry may include a unique identifier of the user or an account number related to the account 116.

In block 216, the computer system 134 notifies the user 106 that the service 120 is active. For example, the computer system 134 can transmit a message to the user 106 indicating that the service 120 is now active. Additionally or alternatively, the computer system 134 can notify the mobile application 108 that the service 120 is now active for the user 106. The mobile application 108 can then output corresponding information to the user 106 in its interface.

Figure 3A:
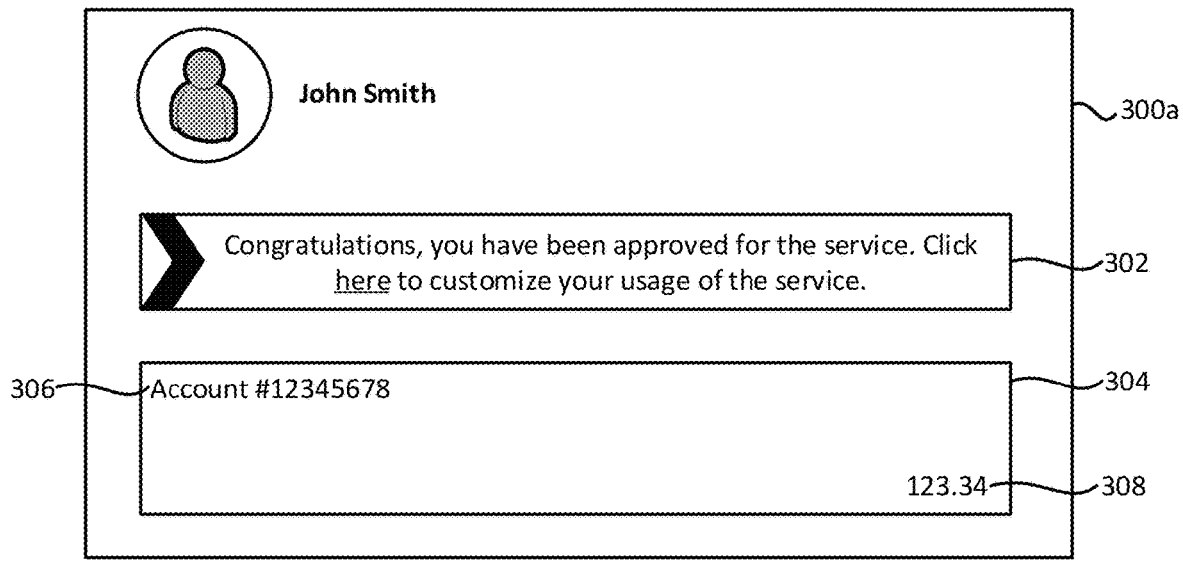
FIGS. 3A-B depict examples of graphical user interfaces for implementing some aspects of the present disclosure.
Figure 3B:
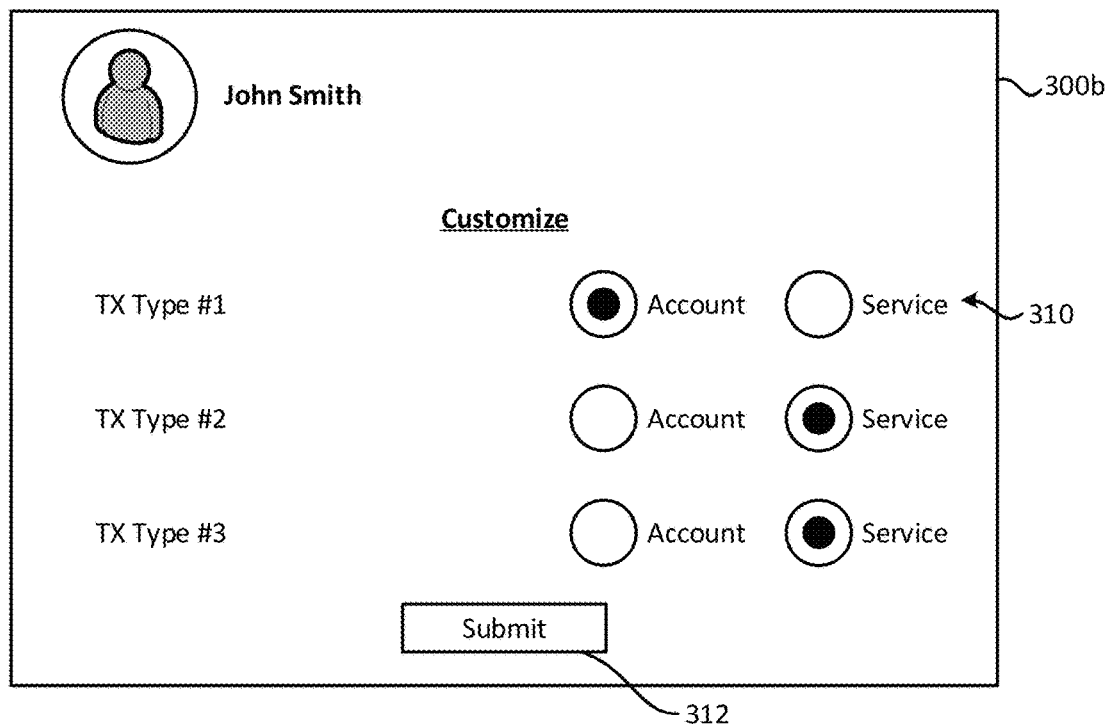

In block 218, the mobile application 108 can provide the user 106 with a user interface through which the user 106 can selectively apply rules to the access card 132. One example of the user interface is shown in FIGS. 3A-3B. As shown in FIG. 3A, the user interface may include an interface page 300*a* that may be displayed on the client device 102. The interface page 300a can include a notification 302 indicating that the service 120 is now active for the user 106. The interface page 300a may additionally or alternatively include account data 304 related to the user's account 116. The account data 304 can describe one or more characteristics of the account 116. Examples of the account data 304 can include an account name, number 306, balance 308, or other characteristic. In some examples, the user 106 can select a graphical element, such as the notification 302, within the interface page 300a to transition to another interface page 300b, through which the user 106 may be able to selectively apply rules to the access card 132.

An example of the other interface page 300b is shown in FIG. 3B. As shown, the interface page 300b can include selection options 310, which can include any suitable type of graphical elements such as radio buttons, check boxes, pull down menus, icons, text boxes, etc. The user 106 may interact with the selection options 310 to select how different types of tasks (e.g., transactions abbreviated "TX" in FIG. 3B) are to be handled by the service provider 112. In the example shown in FIG. 3B, the user 106 selected that TX Type #1 is be completed using the account 116, TX Type #2 is to be completed using the service 120, and TX Type #3 is to be completed using the service 120. But other examples may involve more options. Once the user 106 has input the selections, the user 106 can interact with a submit button 312 to finalize the process. In response to detecting such an interaction, the mobile application 108 can transmit the user's selections to the computer system 134.

Continuing with FIG. 2, in block 220 the computer system 134 receives the user's rules as to how to handle different types of tasks. For example, the computer system 134 can receive the selections input by the user 106 to the interface page 300b described above. The computer system 134 may receive the rules in one or more communications transmitted by the client device 102 via a network 110.

In block 222, the computer system 134 implements the user's customizations (e.g., rules). This may involve generating and transmitting control data to the routing application 124 to configure the routing application 124 in accordance with the user's customizations. As a result, subsequent requests initiated using the access card 132 may be distributed between the account subsystem 114 and the service subsystem 118 in a manner that complies with the user's rules.

In some examples, the process can repeat over time. For example, the process can include block 226 during which the computer system 134 can wait for a predetermined time period. Upon the expiration of the predetermined time period, the process can return to block 202 and restart with the receipt of updated usage data relating to the user's account 116.

Figure 4:
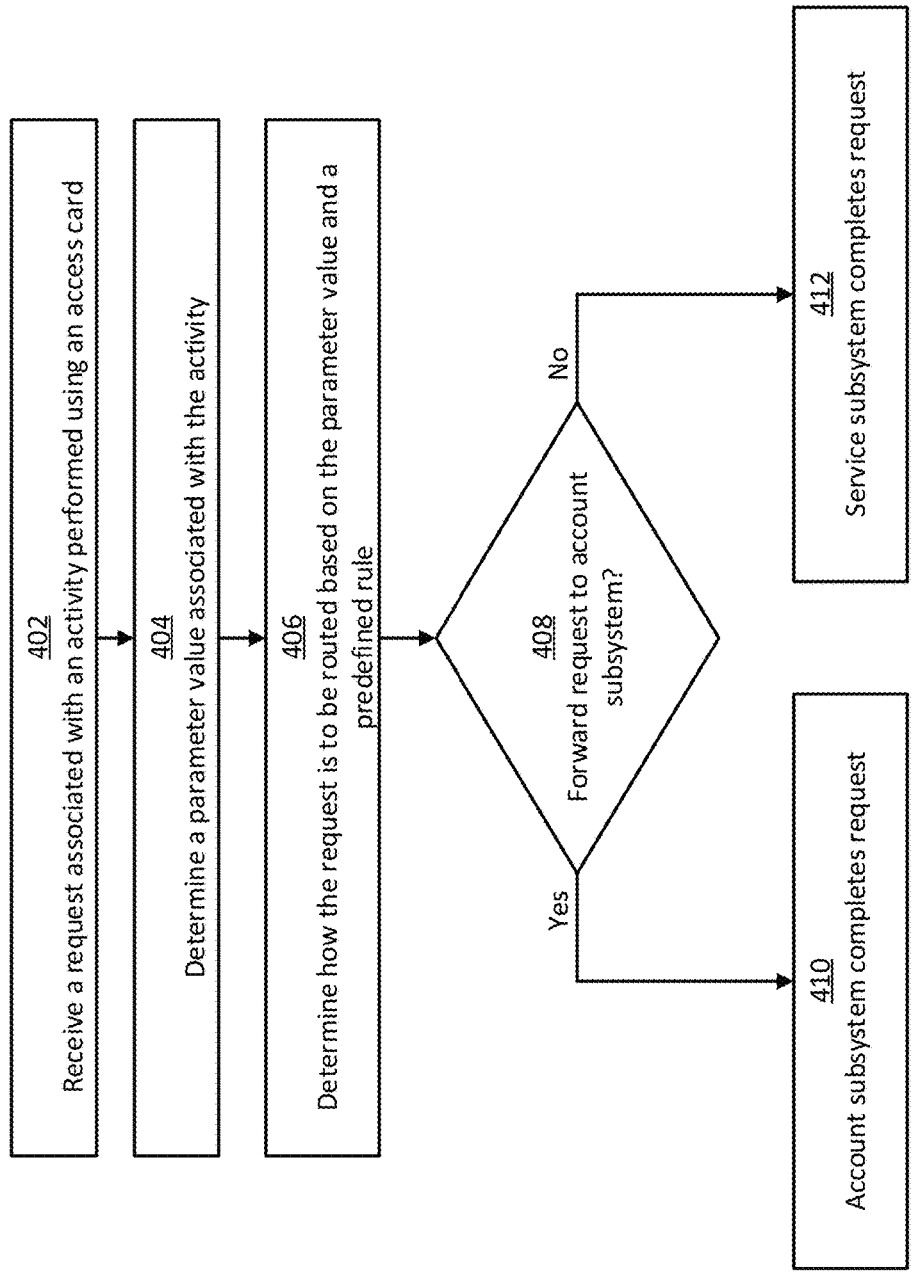
FIG. 4 is a flow chart of an example of a routing process for implementing some aspects of the present disclosure.

FIG. 4 is a flow chart of an example of a process for implementing some aspects of the present disclosure. Other examples may involve more operations, fewer operations, different operations, or a different order of the operations than are shown in FIG. 4. The operations below will now be described with reference to the components of FIG. 1 above.

In block 402, a computer system 134 receives a request 126, such as a network request received via the network 110, associated with an activity performed by a user 106 using an access card 132. The activity may have been performed in relation to a third party 104, such as swiping an access card 132 owned by the user 106 at an endpoint device operated by the third party 104.

In block 404, the computer system 134 determines one or more parameter values associated with the activity. This may involve analyzing the headers or payloads of one or more data packets associated with the request 126. For example, the computer system 134 may extract the payload data from one or more data packets associated with the request 126 and analyze the payload data to determine the parameter values.

In block 406, the computer system 134 determines how the request 126 is to be handled based on the parameter value and a predefined rule, which may have been previously specified by the user 106 via a mobile application 108. For example, the computer system 134 may include a routing application 124 storing control data 136 that was previously generated or updated based on the rule. The control data 136 can specify how requests related to tasks having the parameter value are to be routed. The routing application 124 can access the control data 136 to determine how to route the request 126.

In block 408, the computer system 134 (e.g., the routing application 124) determines whether the request 126 is to be forwarded to an account subsystem 114 based on the determination made in block 406. In some examples, the computer system 134 may be configured to forward the request 126 to the account subsystem 114 by default.

If the computer system 134 determines that the request 126 is to be forwarded to the account subsystem 114, the process can proceed to block 410 where the computer system 134 can transmit the request 126 to the account subsystem 114. Otherwise, the process can proceed to block 412 where the computer system 134 can transmit the request 126 to a service subsystem 118.

Figure 5:
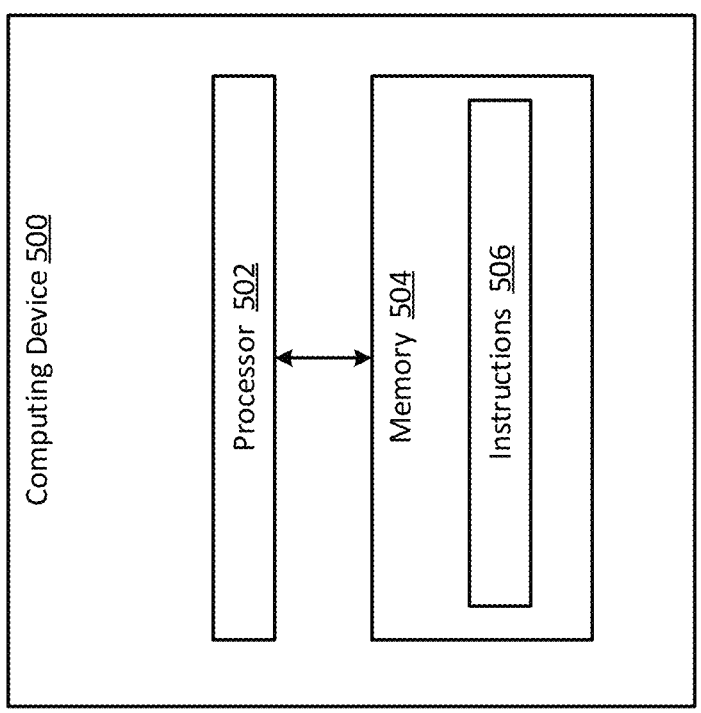
FIG. 5 is a block diagram of an example of a computing device for implementing some aspects of the present disclosure.

FIG. 5 is a block diagram of an example of a computing device 500 for implementing some aspects of the present disclosure. The computing device 500 may correspond to the client device 102 or may be part of the computer system 134 described above.

The computing device 500 includes a processing device 502 coupled to a memory device 504 via a bus. The processing device 502 can include one processing device or multiple processing devices. Non-limiting examples of the processing device 502 include a Field-Programmable Gate Array (FPGA), an application-specific integrated circuit (ASIC), a microprocessor, etc. The processing device 502 can execute instructions 506 stored in the memory device 504 to perform operations. Examples of such operations can include any of the operations described above with respect to the client device 102 or the computer system 134. In some examples, the instructions 506 can include processor-specific instructions generated by a compiler or an interpreter from code written in any suitable computer-programming language, such as C, C++, C #, etc.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device can include a medium from which the processing device 502 can read instructions 506. A computer-readable medium can include electronic, optical, magnetic, or other storage devices capable of providing the processing device 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

The computing device 500 may also include other input and output (I/O) components, which are not shown here for simplicity. Examples of such input components can include a mouse, a keyboard, a trackball, a touch pad, and a touch-screen display. Examples of such output components can include a visual display, an audio display, and a haptic display. Examples of a visual display can include a liquid crystal display (LCD), a light-emitting diode (LED) display, and a touch-screen display. An example of an audio display can include speakers. An example of a haptic display may include a piezoelectric vibration device or an ERM device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
   an access card of a user, the access card being associated with an account of the user with a service provider; and
   a client device of the user, the client device including:
      one or more processors; and
      a memory including program code for a mobile application that is executable by the one or more processors for causing the one or more processors to:
         provide a graphical user interface through which the user can input a rule for how a transaction facilitated using the access card is to be handled by the service provider, the graphical user interface being configured to enable the user to select between having the transaction handled using (i) the account of the user or (ii) a service offered to the user by the service provider separately from the account, wherein the graphical user interface is configured to enable the user to provide a threshold as part of the rule, and wherein a computer system is configured to:
            use the account or the service to perform a first type of transaction, in response to determining that the first type of transaction has a first parameter value that exceeds the threshold; and
            use the other of the account or the service to perform a second type of transaction, in response to determining that the second type of transaction has a second parameter value that is below the threshold;
         receive, through the graphical user interface, the input from the user indicating the rule, wherein the rule dictates whether the transaction is to be handled using the account or the service; and
         in response to receiving the input, transmit one or more commands to the computer system associated with the service provider, the computer system being configured to receive the one or more commands and implement the rule selected by the user of the access card.

2. The system of claim 1, wherein the graphical user interface is configured to enable the user to input rules by selecting between using the account and the service in relation to a plurality of types of transactions.

3. The system of claim 1, wherein the mobile application further includes program code that is executable by the one or more processors for causing the one or more processors to:
   receive a notification, from the computer system, indicating that the user is authorized to access the service;
   based on receiving the notification, generate a visual notification indicating that the user is authorized to use the service;
   detect a manipulation of the visual notification by the user; and
   in response to detecting the manipulation, transmit a command to the computer system for activating the service for the user.

4. The system of claim 1, wherein the computer system is configured to:
   receive, via a network, a network request associated with usage of the access card, the network request corresponding to the transaction; and
   extract data from the network request; and
   forward the data to an account subsystem or a service subsystem depending on the rule.

5. The system of claim 4, wherein usage of the access card includes providing account data stored or printed on the access card to a website of an entity that is different from the user and the service provider.

6. A method comprising:
   providing, by one or more processors of a client device, a graphical user interface through which a user can input a rule for how a transaction facilitated using an access card is to be handled by a service provider, the graphical user interface being configured to enable the user to select between having the transaction handled using (i) an account of the user with the service provider or (ii) a service offered to the user by the service provider separately from the account, the access card being associated with the account of the user with the service provider, wherein the graphical user interface is configured to enable the user to provide a threshold as part of the rule, and wherein a computer system is configured to:
      use the account or the service to perform a first type of transaction, in response to determining that the first type of transaction has a first parameter value that exceeds the threshold; and
      use the other of the account or the service to perform a second type of transaction, in response to determining that the second type of transaction has a second parameter value that is below the threshold;
   receive, by the one or more processors and through the graphical user interface, the input from the user indicating the rule, wherein the rule dictates whether the transaction is to be handled using the account or the service; and
   in response to receiving the input, transmitting, by the one or more processors, one or more commands to the computer system associated with the service provider, the computer system being configured to receive the one or more commands and implement the rule selected by the user of the access card.

7. The method of claim 6, wherein the graphical user interface is configured to enable the user to input rules by selecting between using the account and the service in relation to a plurality of types of transactions.

8. The method of claim 6, further comprising:
   receiving a notification, from the computer system, indicating that the user is authorized to access the service;
   based on receiving the notification, generating a visual notification indicating that the user is authorized to use the service;

detecting a manipulation of the visual notification by the user; and in response to detecting the manipulation, transmitting a command to the computer system for activating the service for the user.

9. The method of claim 6, wherein the computer system is configured to:

receive, via a network, a network request associated with usage of the access card, the network request corresponding to the transaction; and extract data from the network request; and forward the data to an account subsystem or a service subsystem depending on the rule.

10. The method of claim 9, wherein usage of the access card includes providing account data stored or printed on the access card to a website of an entity that is different from the user and the service provider.

11. A non-transitory computer-readable medium comprising program code that is executable by one or more processors of a client device for causing the one or more processors to:

receive a notification, from a computer system associated with a service provider, indicating that a user is authorized to access a service;

based on receiving the notification, generate a visual notification indicating that the user is authorized to use the service;

detect a manipulation of the visual notification by the user;

in response to detecting the manipulation, transmit a command to the computer system for activating the service for the user, the computer system being configured to activate the service for the user in response to receiving the command;

subsequent to transmitting the command to the computer system, provide a graphical user interface through which the user can input a rule for how a transaction facilitated using an access card is to be handled by the service provider, the graphical user interface being configured to enable the user to select between having the transaction handled using (i) an account of the user with the service provider or (ii) the service, the service being offered to the user by the service provider separately from the account;

receive, through the graphical user interface, the input from the user indicating the rule, wherein the rule dictates whether the transaction is to be handled using the account or the service; and in response to receiving the input, transmit one or more commands to the computer system associated with the service provider, the computer system being configured to receive the one or more commands and implement the rule selected by the user of the access card.

12. The non-transitory computer-readable medium of claim 11, wherein the graphical user interface is configured to enable the user to input rules by selecting between using the account and the service in relation to a plurality of types of transactions.

13. The non-transitory computer-readable medium of claim 11, wherein the graphical user interface is configured to enable the user to provide a threshold as part of the rule, and wherein the computer system is configured to:

use the account to perform a first type of transaction, in response to determining that the first type of transaction has a first parameter value that exceeds the threshold; and use the service to perform a second type of transaction, in response to determining that the second type of transaction has a second parameter value that is below the threshold.

14. The non-transitory computer-readable medium of claim 11, wherein the graphical user interface is configured to enable the user to provide a threshold as part of the rule and wherein the computer system is configured to:

use the account to perform a first type of transaction in response to determining that the first type of transaction has a first parameter value that is below the threshold; and use the service to perform a second type of transaction in response to determining that the second type of transaction has a second parameter value that exceeds the threshold.

15. The non-transitory computer-readable medium of claim 11, wherein the computer system is configured to:

receive, via a network, a network request associated with usage of the access card, the network request corresponding to the transaction; and extract data from the network request; and forward the data to an account subsystem or a service subsystem depending on the rule.

* * * * *